Patented June 9, 1925.

1,541,609

UNITED STATES PATENT OFFICE.

CHARLES W. ADAMS, OF SAGINAW, MICHIGAN, ASSIGNOR TO THE UNITED STATES GRAPHITE COMPANY, OF SAGINAW, MICHIGAN, A CORPORATION OF MICHIGAN.

CONTACT BRUSH FOR ELECTRIC MOTORS AND GENERATORS.

No Drawing.  Application filed June 14, 1924. Serial No. 720,130.

*To all whom it may concern:*

Be it known that I, CHARLES W. ADAMS, a citizen of the United States, residing at Saginaw, in the county of Saginaw and State of Michigan, have invented a new and useful Improved Contact Brush for Electric Motors and Generators.

The object of my invention is to provide for the commutators of electric motors and generators a commutator brush which has low specific resistance, and high carrying capacity as well as low contact drop, and which at the same time will have but little wearing effect upon the commutator. To meet the first mentioned requirements, it has been common to make such brushes of a composition of metals and graphite composed largely of copper, but owing to the nature of the processes which must be employed to form a uniform composition of copper, other metals and graphite a product having low specific resistance and high carrying capacity and low contact drop is expensive to produce and in addition it is difficult to attach shunts or flexible leads or conductors to such composite brushes.

I have devised a commutator brush which overcomes these various difficulties, possessing the required low specific resistance, and high carrying capacity and low contact drop, and yet less wearing on the commutators than composition metal graphite brushes and at the same time it is inexpensive to make and at the same time easy of connection to the conductor.

I make my brush of an alloy of copper and lead, without carbon or graphite. I prefer to make the alloy of approximately fifty parts of copper to fifty parts of lead, but the proportions may be varied somewhat, as, for example, up to say about 60 parts of one to about 40 of the other. If more than about 60 parts of copper be used, the alloy becomes too hard to give good results. If more than about 60 parts of lead be used, the resistance and carrying capacity and contact drop are not satisfactory, and the brush wears away too rapidly.

I find that an alloy of substantially 50 parts of copper to 50 parts of lead gives the best results.

I am aware that composition metal graphite brushes have heretofore been used, and as a typical example, I may mention one made of copper 80%, tin 8%, lead 5% and graphite 7%. In such a combination, the graphite is added in the nature of a lubricant to compensate for the hardness of the brush, which consists mainly of copper. By my invention, I dispense with the use of graphite, and thereby I produce a brush easier and simpler to make than those using graphite. I prefer not to use tin, although a small percentage may be used, if desired. The important consideration is that my brush is composed substantially of the alloy of copper and lead with about 40% or more of lead.

I claim as my invention:

1. An electrical commutator brush composed of an alloy of copper and lead, with not less than about 40 per cent lead.

2. An electrical commutator brush, composed of an alloy of copper and lead, with not less than about 40 per cent lead, and substantially free from carbon or graphite.

3. An electrical commutator brush, composed of an alloy of 50 per cent copper and 50 per cent lead.

In testimony whereof I have signed my name to this specification.

CHAS. W. ADAMS.